United States Patent
Ishibashi

(10) Patent No.: US 8,432,391 B2
(45) Date of Patent: Apr. 30, 2013

(54) REMOTE CONTROL DEVICE AND REMOTE CONTROL METHOD

(75) Inventor: Yudai Ishibashi, Osaka (JP)

(73) Assignee: Panasonic Corporation, Osaka (JP)

(*) Notice: Subject to any disclaimer, the term of this patent is extended or adjusted under 35 U.S.C. 154(b) by 534 days.

(21) Appl. No.: 12/671,532

(22) PCT Filed: May 29, 2009

(86) PCT No.: PCT/JP2009/002380
§ 371 (c)(1),
(2), (4) Date: Feb. 1, 2010

(87) PCT Pub. No.: WO2009/147806
PCT Pub. Date: Dec. 10, 2009

(65) Prior Publication Data
US 2011/0018864 A1   Jan. 27, 2011

(30) Foreign Application Priority Data
Jun. 2, 2008   (JP) .................. 2008-144458

(51) Int. Cl.
*G06T 15/00*   (2011.01)
*G09G 5/00*   (2006.01)

(52) U.S. Cl.
USPC ......................... 345/419; 345/156

(58) Field of Classification Search .............. None
See application file for complete search history.

(56) References Cited

U.S. PATENT DOCUMENTS

| 8,219,018 | B2 | 7/2012 | Hara |
| 2004/0246229 | A1 | 12/2004 | Yamada |
| 2007/0032297 | A1 | 2/2007 | Hara |

FOREIGN PATENT DOCUMENTS

| CN | 1841290 | 10/2006 |
| CN | 1908949 | 2/2007 |
| JP | 2000-075991 | 3/2000 |
| JP | 2004-265222 | 9/2004 |
| JP | 2005-322055 | 11/2005 |

OTHER PUBLICATIONS

English Translation of JP, 2000-075991.*
English Translation of JP, 2004-265222.*
Foley et al., "Computer Graphics: Principles and Practice", Jul. 1997, Addison-Wesley, 2nd Edition. section 6.1 and 6.4.*
International Search Report issued Sep. 8, 2009 in International (PCT) Application No. PCT/JP2009/002380.
Satoshi Yonemoto et al., "Affordance-based Perceptual User Interfaces", ITE Technical Report, vol. 27, No. 9, Feb. 4, 2003, pp. 171-176.

* cited by examiner

*Primary Examiner* — Kee M Tung
*Assistant Examiner* — Sing-Wai Wu
(74) *Attorney, Agent, or Firm* — Wenderoth, Lind & Ponack, L.L.P.

(57) ABSTRACT

A remote control device remotely controls a digital mirror apparatus. The remote control device includes: a three-dimensional rendering unit that generates first and second user images from first and second three-dimensional models; a first operation determination unit that determines whether or not the menu image overlaps with the second user image; a second operation determination unit that determines coordinates of a position specified by a user on a display screen based on an amount of the movement of the second user image in a direction perpendicular to the display screen; and an operation information outputting unit that outputs operation information corresponding to the menu image, when it is determined that the menu image overlaps with the second user image and when the determined coordinates are included within a display area of the menu image. The amount of the movement is calculated with reference to data in the depth buffer.

8 Claims, 13 Drawing Sheets

FIG. 2
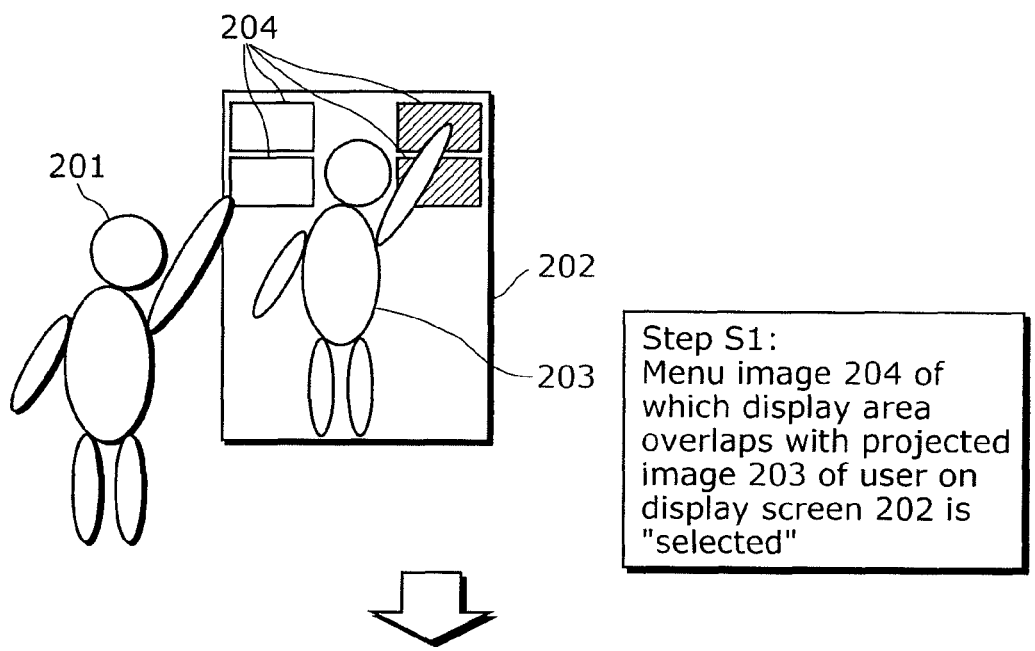
Step S1:
Menu image 204 of which display area overlaps with projected image 203 of user on display screen 202 is "selected"
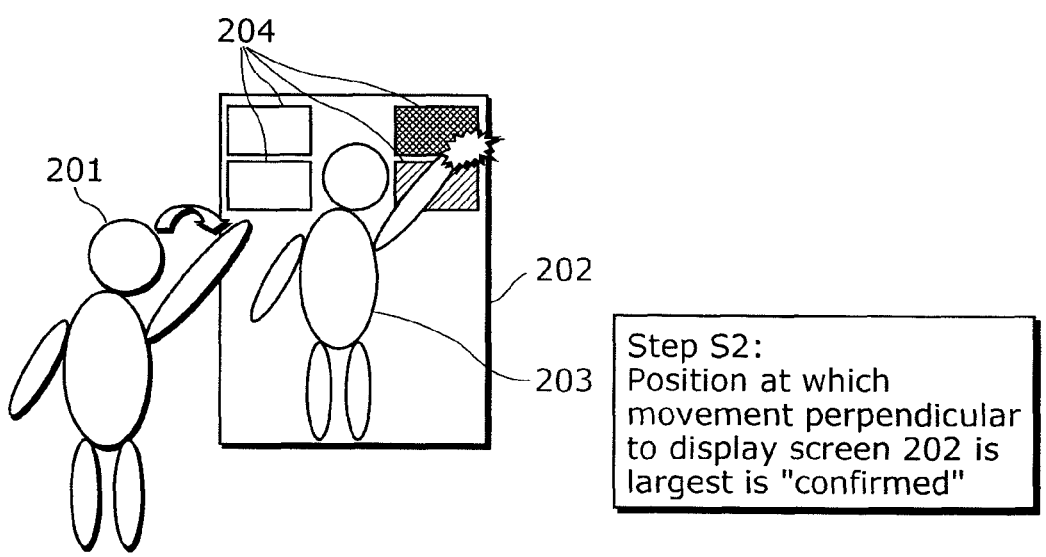
Step S2:
Position at which movement perpendicular to display screen 202 is largest is "confirmed"

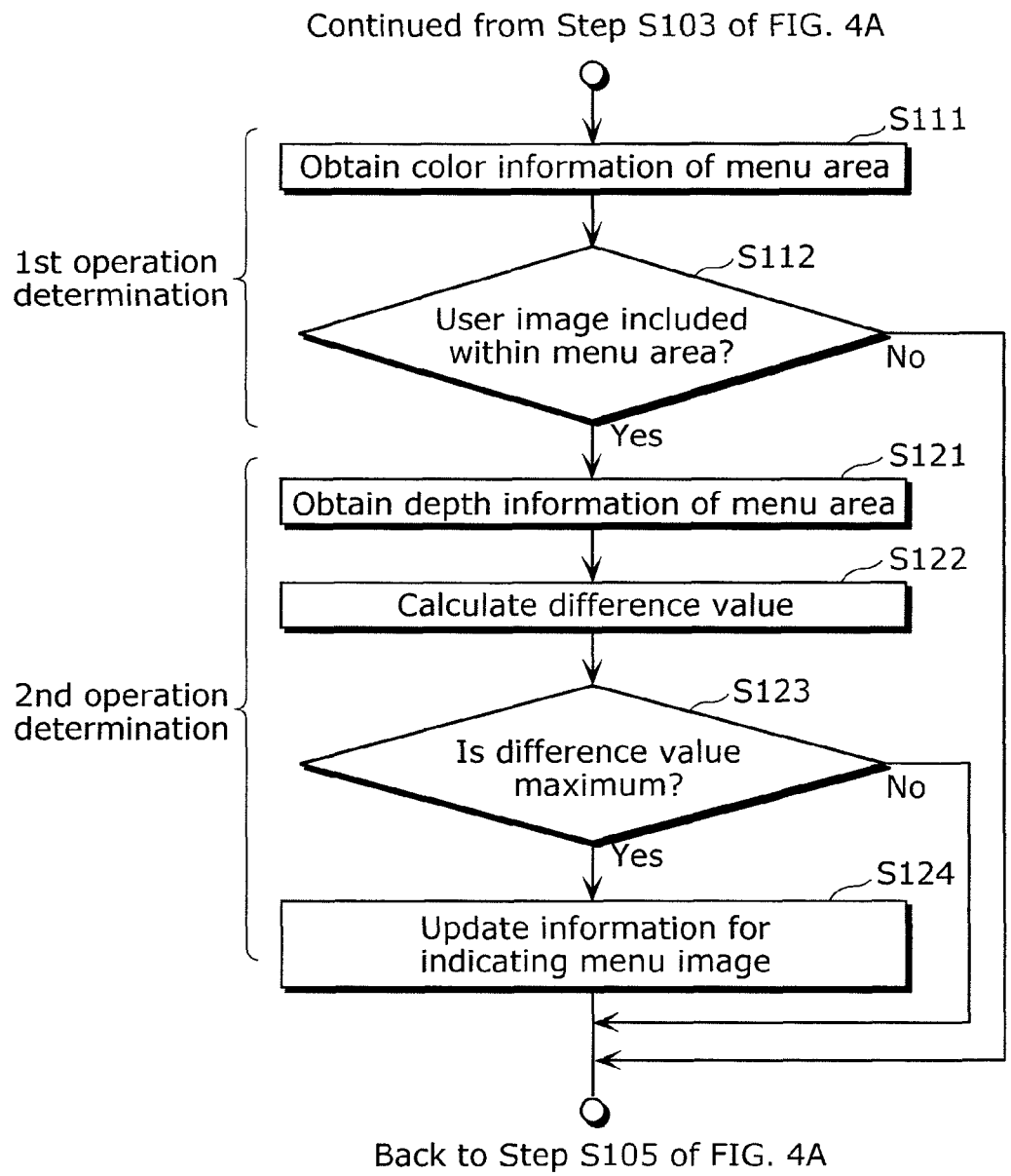

REMOTE CONTROL DEVICE AND REMOTE CONTROL METHOD

BACKGROUND OF THE INVENTION

1. Technical Field

The present invention relates to a remote control device and a remote control method for remotely controlling a device which generates a three-dimensional human form model (hereinafter referred to simply as "three-dimensional model") of a user and displays a user image resulting from three-dimensional rendering of the generated three-dimensional model from a given view point.

2. Background Art

To generate a three-dimensional model of a user and display it from a given view point, such a digital mirror apparatus as shown in FIG. 1 is used. Generally, the digital mirror apparatus uses measurement data obtained by a three-dimensional human form measurement device 102 (which is a camera in FIG. 1) to generate a three-dimensional model of a user 101. The digital mirror apparatus then renders the three-dimensional model, thereby generating a projected image 104 of the user, and displays the generated projected image 104 of the user on a display screen 103.

As a method for remotely controlling the digital mirror apparatus, it is conceivable that the user 101 at a distance from the display screen 103 selects and confirms a menu image displayed on the display screen 103 in the digital mirror apparatus. In such a method for remotely controlling the digital mirror apparatus, the projected image of the user displayed on the display screen is used to remotely control the digital mirror apparatus.

To be specific, as shown in FIG. 2, the digital mirror apparatus determines a menu image 204 which overlaps with a projected image 203 of a user 201 displayed on a display screen 202, as a menu image "selected" by the user 201 (Step S1). Next, the digital mirror apparatus determines, from among the menu images "selected" by the user 201, the menu image including a position at which user's movement perpendicular to the display screen 202 is the largest, as the menu image "confirmed" by the user 201 (Step S2).

Patent literature 1 discloses an example where such a remote control method is applied to a projector. The remote control method disclosed in the patent literature 1 uses, for menu operation, an image projected by a projector and a distance between the projected image by the projector and a projection plane of the projector (depth information).

CITATION LIST

Patent Literature

[PTL 1]
Japanese Unexamined Patent Application Publication No. 2005-322055

SUMMARY OF INVENTION

The above conventional technique, however, requires a separate distance sensor for obtaining the depth information. This means that the above conventional technique involves a problem that a device for measuring the depth information is required in addition to a device for displaying a projected image.

The present invention is therefore made in view of the above problem, and an object of the present invention is to provide a remote control device which has a relatively simple configuration and is capable of remotely controlling a digital mirror apparatus or the like.

In order to achieve the above object, the remote control device according to an aspect of the present invention is a remote control device which outputs operation information corresponding to a menu image displayed on a display screen and specified by a user at a distance from the display screen, the remote control device including: a three-dimensional modeling unit configured to generate a first three-dimensional model and a second three-dimensional model, the first three-dimensional model showing appearance of a form of the user at a first point in time, and the second three-dimensional model showing appearance of a form of the user at a second point in time later than the first point in time; a three-dimensional rendering unit configured to generate a first user image by performing three-dimensional rendering of the first three-dimensional model generated by the three-dimensional modeling unit, and generate a second user image by performing three-dimensional rendering of the second three-dimensional model generated by the three-dimensional modeling unit; a first operation determination unit configured to determine, when the second user image generated by the three-dimensional rendering unit is displayed on the display screen, whether or not the menu image overlaps with the second user image; a second operation determination unit configured to (i) calculate, when the second user image generated by the three-dimensional rendering unit is displayed on the display screen, an amount of movement of the second user image in a direction perpendicular to the display screen, and (ii) determine coordinates of a position specified by the user, on the display screen based on the calculated amount of the movement; and an operation information output unit configured to output operation information corresponding to the menu image, when the first operation determination unit determines that the menu image overlaps with the second user image and when the coordinates determined by the second operation determination unit are included within a display area of the menu image, wherein the second operation determination unit is configured to calculate as the amount of the movement a difference value between a depth value of the first user image and a depth value of the second user image with reference to a depth buffer in which depth information indicative of relation between coordinates on a projection plane and a depth value is stored, the depth information being generated in the three-dimensional rendering of the first three-dimensional model and the second three-dimensional model.

Accordingly, an amount of movement of a user image in a direction perpendicular to a projection plane can be calculated with reference to a depth buffer, with the result that operation information can be outputted without a distance sensor or the like device for detecting a distance between a user and a display screen. This means it is possible to remotely control a digital mirror apparatus or the like with a relatively simple configuration.

Furthermore, it is preferable that the three-dimensional rendering unit be configured to generate the first user image and the second user image by using a first projection matrix in performing the three-dimensional rendering of the first three-dimensional model and the second three-dimensional model and further to generate a third user image by using a second projection matrix in performing the three-dimensional rendering of the second three-dimensional model, the second projection matrix being different from the first projection matrix, and the third user image generated by the three-dimensional rendering unit is displayed on the display screen.

Accordingly, the menu image specified by the user can be determined using a user image for operation, which is different from a user image for display, with the result that the user, no matter at what position or what size he or she is, can be given the same sense of operation each time he or she points to the menu image.

Furthermore, it is preferable that the first projection matrix be an orthogonal projection matrix, and the second projection matrix be a perspective projection matrix.

Accordingly, the user image for display is generated using the orthogonal projection matrix, with the result that the user, no matter where positioned relative to the display screen, can be given the same sense of operation each time he or she points to the menu image.

Furthermore, it is preferable that the first projection matrix be a projection matrix with which a size of the user image changes according to a size of the user and a size of the display screen.

This allows the user to point to the menu image always with the same sense of operation no matter what size he or she is.

Furthermore, the integrated circuit according to an aspect of the present invention is an integrated circuit which outputs operation information corresponding to a menu image displayed on a display screen and specified by a user at a distance from the display screen, the integrated circuit including: a three-dimensional modeling unit configured to generate a first three-dimensional model and a second three-dimensional model, the first three-dimensional model showing appearance of a form of the user at a first point in time, and the second three-dimensional model showing appearance of a form of the user at a second point in time later than the first point in time; a three-dimensional rendering unit configured to generate a first user image by performing three-dimensional rendering of the first three-dimensional model generated by the three-dimensional modeling unit, and generate a second user image by performing three-dimensional rendering of the second three-dimensional model generated by the three-dimensional modeling unit; a first operation determination unit configured to determine, when the second user image generated by the three-dimensional rendering unit is displayed on the display screen, whether or not the menu image overlaps with the second user image; a second operation determination unit configured to (i) calculate, when the second user image generated by the three-dimensional rendering unit is displayed on the display screen, an amount of movement of the second user image in a direction perpendicular to the display screen, and (ii) determine coordinates of a position specified by the user, on the display screen based on the calculated amount of the movement; and an operation information output unit configured to output operation information corresponding to the menu image, when the first operation determination unit determines that the menu image overlaps with the second user image and when the coordinates determined by the second operation determination unit are included within a display area of the menu image, wherein the second operation determination unit is configured to calculate as the amount of the movement a difference value between a depth value of the first user image and a depth value of the second user image with reference to a depth buffer in which depth information indicative of relation between coordinates on a projection plane and a depth value is stored, the depth information being generated in the three-dimensional rendering of the first three-dimensional model and the second three-dimensional model.

It is to be noted that the present invention can be implemented not only as such a remote control device, but also as a remote control method including steps of operation of characteristic components of such a remote control device and also as a program which causes a computer to execute these steps.

ADVANTAGEOUS EFFECTS OF INVENTION

According to the present invention, an amount of movement of a user image in a direction perpendicular to a projection plane can be calculated with reference to a depth buffer, with the result that operation information can be outputted without a distance sensor or the like device for detecting a distance between a user and a display screen. This means it is possible to remotely control a digital mirror apparatus or the like with a relatively simple configuration.

INFORMATION ABOUT TECHNICAL BACKGROUND TO THIS APPLICATION

The disclosure of Japanese Patent Application No. 2008-144458 filed on Jun. 2, 2008 including specification, drawings and claims is incorporated herein by reference in its entirety.

BRIEF DESCRIPTION OF DRAWINGS

FIG. 2 is a view for explaining a remote control method preferably used in the conventional digital mirror apparatus.

FIG. 4B is a flowchart showing a process flow in the remote control device according to the first embodiment of the present invention.

DETAILED DESCRIPTION OF THE INVENTION

The following shall describe embodiments of the present embodiments with reference to the drawings.

First Embodiment

Figure 1:
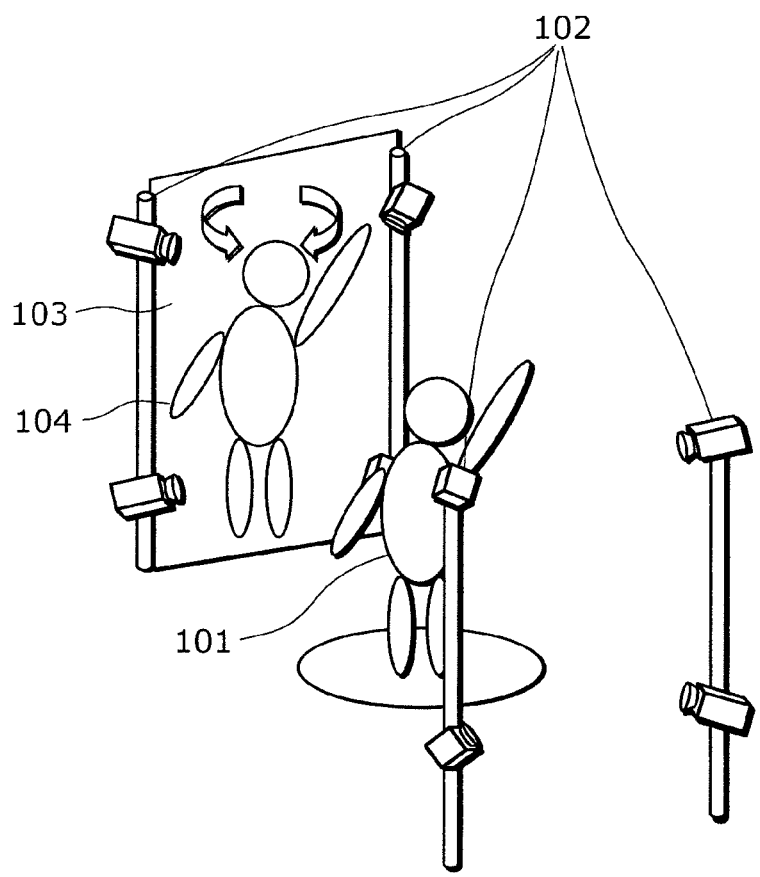
FIG. 1 is a schematic view of a conventional digital mirror apparatus.
Figure 3:
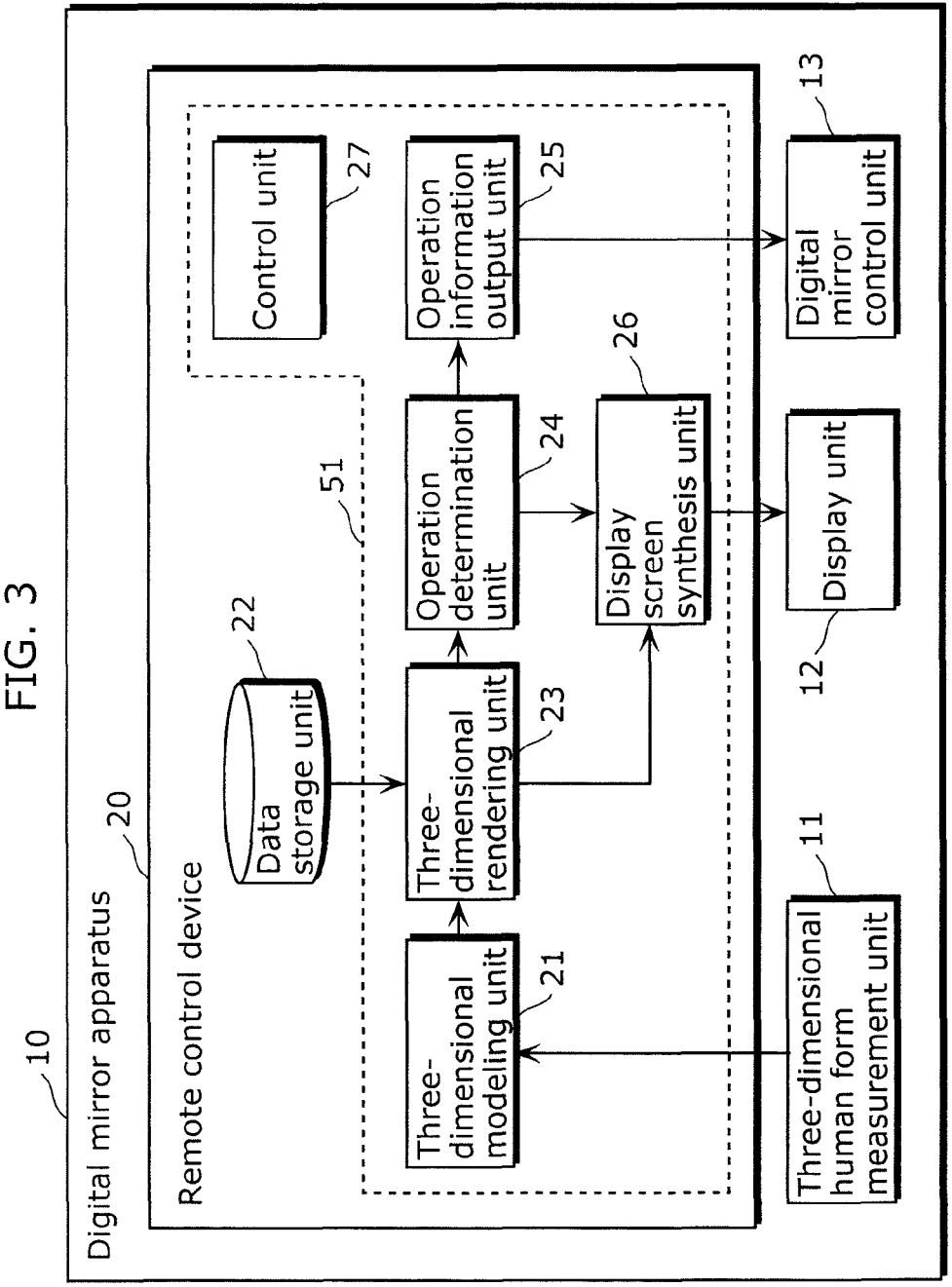
FIG. 3 is a block diagram showing a functional configuration of a digital mirror apparatus provided with a remote control device according to a first embodiment of the present invention.

FIG. 3 is a block diagram which shows a functional configuration of a digital mirror apparatus provided with a remote control device according to the first embodiment of the present invention. As shown in FIG. 3, a digital mirror apparatus 10 includes a three-dimensional human form measurement unit 11, a display unit 12, an electronic mirror control unit 13, and a remote control device 20.

The three-dimensional human form measurement unit 11 measures a three-dimensional human form of a user and outputs the measurement data to a three-dimensional modeling unit 21 of the remote control device 20. To measure the three-dimensional human form of the user, the three-dimensional human measurement unit 11 may use a method generally employed to measure a three-dimensional human form, such as a stereo measurement method or a light-section method.

The display unit 12 has a display screen such as a liquid crystal display to display an image for display outputted from a display image synthesis unit 26.

The electronic mirror control unit 13 controls operation of components constituting the digital mirror apparatus 10. According to operation information outputted from an operation information output unit 25, the electronic mirror control unit 13 controls the operation of the components. For example, when the operation information indicates an increase in luminance, the electronic mirror control unit 13 increases the luminance of the image to be displayed, by a predetermined value.

The remote control device 20 is a device which outputs operation information corresponding to a menu image displayed on the display screen, in accordance with movement of the user at a distance from the display screen. The remote control device 20 includes a three-dimensional modeling unit 21, a data storage unit 22, a three-dimensional rendering unit 23, an operation determination unit 24, an operation information output unit 25, a display image synthesis unit 26, and a control unit 27.

The three-dimensional modeling unit 21 sequentially generates three-dimensional models of the user, using the measurement data obtained by the three-dimensional human form measurement unit 11. To be specific, the three-dimensional modeling unit 21 generates the three-dimensional models by using, for example, the Delaunary triangulation method or the Marching Cubes method, which is commonly used to generate three-dimensional models.

The data storage unit 22 is a storage medium such as a memory and stores a rendering parameter including a projection matrix.

Using the rendering parameter stored in the data storage unit 22, the three-dimensional rendering unit 23 performs three-dimensional rendering of the three-dimensional model generated by the three-dimensional modeling unit 21, thereby generating a two-dimensional projection image (hereinafter referred to simply as "user image"). To be specific, the three-dimensional rendering unit 23 generates the user image by performing a series of rendering processes including modeling transformation, light source calculation, projective transformation, viewport transformation, and texture mapping. Through these rendering processes, the three-dimensional rendering unit 24 stores color information and depth information into a color buffer and a depth buffer, respectively, which are buffer memories (not shown).

The color information stored in to the color buffer is information which indicates a relation between a color and a position in the projection plane on which a three-dimensional model is projected. The depth information stored into the depth buffer is information which indicates a relation between a depth value and a position in the projection plane on which a three-dimensional model is projected.

An operation determination unit 24 is one example of the first and second operation determination units, and performs the first and second operation determinations with reference to the color information and the depth information, which the three-dimensional rendering unit 23 has stored into the color buffer and the depth buffer, respectively.

To be specific, when the user image generated by the three-dimensional rendering unit 23 is displayed on the display screen, the operation determination unit 24 determines, with reference to the color information stored in the color buffer, whether or not the menu image overlaps with the user image (the first operation determination).

Furthermore, the operation determination unit 24 calculates an amount of movement of the user image in the direction perpendicular to the display screen when the user image generated by the three-dimensional rendering unit 23 is displayed. On the basis of the measured amount of movement, the operation determination unit 24 then determines, on the display screen, coordinates of a position pointed to by the user (the second operation determination). To be specific, the operation determination unit 24 determines, as coordinates of the position pointed to by the user, coordinates on the display screen which coordinates correspond to a position in projection plane at which position the amount of movement is the largest, for example. It is to be noted that the operation determination unit 24 calculates, as the amount of movement, a difference in depth values between a current user image and a past user image, with reference to the depth buffer.

When the operation determination unit 24 determines that menu image overlaps with the second user image, and the coordinates determined by the operation determination unit 24 are included within the area where the menu image is displayed, the operation information output unit 25 outputs operation information corresponding to the menu image, to the image synthesis unit 26, the electronic mirror control unit 13, and the like. The operation information corresponding to the menu image may be obtained from, for example, an operation information table which stores menu images and operation information in association with one another.

The display image synthesis unit 26 generates a menu image for display based on the operation information outputted by the operation information output unit 25. The display image synthesis unit 26 then generates an image for display by combining the generated menu image for display with the user image generated by the three-dimensional rendering unit 23. Subsequently, the display image synthesis unit 26 outputs the generated image for display to the display unit 12.

The control unit 27 controls operation of components constituting the remote control device 20.

It is to be noted that the three-dimensional model generated by the three-dimensional modeling unit 21, the user image generated by the three-dimensional rendering unit 23, or the like may be stored in a storage unit (not shown). In such a case, the components read the three-dimensional model or user image stored in the storage unit, and executes the processes by using the read three-dimensional model or user image.

Next, operation of the remote control device 20 configured as above will be described.

Figure 4A:
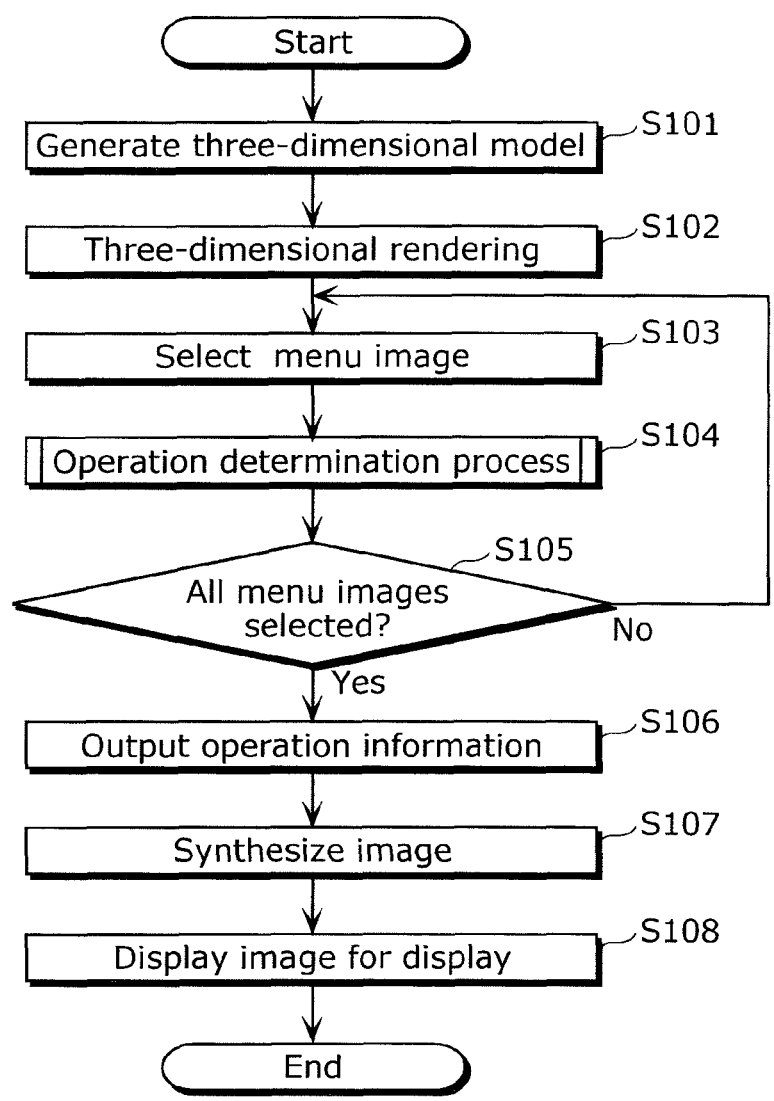
FIG. 4A is a flowchart showing a process flow in the remote control device according to the first embodiment of the present invention.
Figure 5:
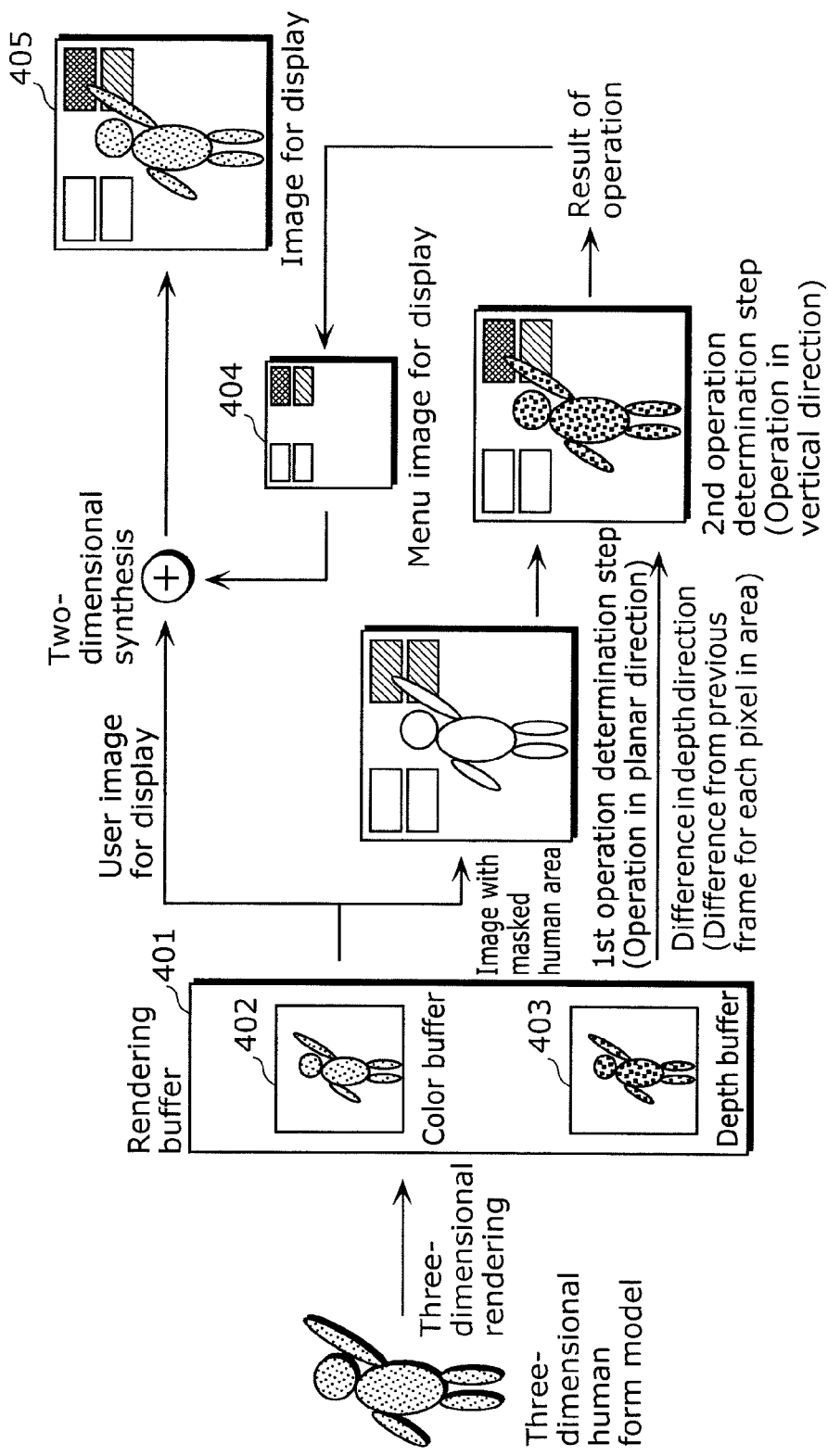
FIG. 5 is a view for explaining the process flow in the remote control device according to the first embodiment of the present invention.

FIGS. 4A and 4B are flowcharts showing a process flow in the remote control device according to the first embodiment of the present invention. FIG. 5 is a view for explaining the process flow in the remote control device according to the first embodiment of the present invention.

Referring to FIG. 4A, the overall process flow in the remote control device 20 will be described first.

Firstly, the three-dimensional modeling unit 21 generates the three-dimensional model from the three-dimensional human form measurement data of the user (S101).

Next, the three-dimensional rendering unit 23 performs the three-dimensional rendering of the three-dimensional model to generate the user image which is to be displayed on the display screen. In generating the user image, the three-dimensional rendering unit 23 generates the color information and the depth information, and stores the generated color information and depth information into a rendering buffer 401 (S102). As shown in FIG. 5, the rendering buffer 401 is composed of a color buffer 402 for storing color information which represents a projected image of the user on the display screen, and a depth buffer 403 for storing depth information which represents a distance between the user and the display screen.

Subsequently, the operation determination unit 24 selects a menu image which is to be used for the operation determination and is not yet selected (S103).

Next, the operation determination unit 24 performs an operation determination process by using the color information stored in the color buffer 402 and the depth information stored in the depth buffer 403 (S104). The operation determination process will be described later in detail with reference to FIG. 4B.

The operation determination unit 24 then determines whether or not all the menu images displayed on the display screen are selected in Step S103 (S105). When not all the menu images are selected (No in S105), the operation determination unit 24 repeats the process from Step S103 to S104. When all the menu images are selected (Yes in Step S105), the operation information output unit 25 outputs operation information which corresponds to the menu image indicated by confirmation information and "confirmed" by the user (S106).

Next, the display image synthesis unit 26 generates a menu image for display 404 based on the outputted operation information. To be specific, the display image synthesis unit 26 generates the menu image for display 404 by changing, for example, the color of the menu image indicated by the operation information. The display image synthesis unit 26 then outputs to the display unit 12 the image for display 405 which is combination of the generated menu image for display 404 with the user image (S107). Lastly, the display unit 12 displays the image for display 405 on the display screen (S108).

Next, referring to FIG. 4B, the operation determination process in the remote control device 20 will be described. In the operation determination process for determining the menu image selected and confirmed by the user, the rendering buffer 401 is referred to. The operation determination process includes the first operation determination for determining the menu image "selected" by the user, and the second operation determination for determining the menu image "confirmed" by the user.

The first operation determination (S111 and S112) will be described first. The operation determination unit 24 obtains from the color buffer 402 the color information of a display area of the menu image selected in Step S103 (S111). Next, the operation determination unit 24 determines whether or not the user image is included within the display area of the menu image (S112). To be specific, when color information at a position corresponding to a display area of a menu image is different from its default value, for example, the operation determination unit 24 determines that the user image is included within the display area of the menu image.

When the user image is included within the display area of the menu image (Yes in S112), the operation determination unit 24 determines that the menu image is selected by the user, and performs the second operation determination. When the user image is not included within the display area of the menu image (No in S112), the operation determination unit 24 determines that the menu image is not selected by the user, and does not perform the second operation determination.

Next, the second operation determination (S121 to S124) will be described. The operation determination unit 24 obtains from the depth buffer 403 the depth information of a display area of the menu image selected in Step S103 (S121). The operation determination unit 24 obtains current and past depth information from the depth buffer 403. To be specific, the operation determination unit 24 obtains from the depth buffer 403 depth information which is generated based on the three-dimensional model generated in Step S101, and depth information which is generated based on another three-dimensional model generated just before the above three-dimensional model.

Next, the operation determination unit 24 calculates, for each position in the projection plane, a difference value between the depth values indicated by the obtained depth information (S122). Subsequently, the operation determination unit 24 determines whether or not the maximum value of the calculated difference values is larger than the maximum value of already-calculated difference values for the other menu images (S123).

When the maximum value of the calculated difference values is larger than the maximum value of already-calculated difference values for the other menu images (S123), the operation determination unit 24 updates the confirmation information for indicating the menu image "confirmed" by the user, to information for indicating the currently working menu image (S124).

As above, the remote control device 20 according to the present embodiment is capable of determining the menu image "selected" and "confirmed" by the user with reference to the color information stored in the color buffer and the depth information stored in the depth buffer. To put it another way, the remote control device 20 is capable of obtaining the information horizontal to the display screen, which is used in the first operation determination, as the color information stored in the color buffer, and the information vertical to the display screen, which is used in the second determination, as the depth information stored in the depth buffer, through the three-dimensional rendering process for generating the user image to be displayed, thus eliminating the need for another measurement or recognition process. That is, the remote control device 20 requires only a relatively simple configuration to remotely control the digital mirror apparatus 10.

It is to be noted that the color information referred to by the operation determination unit 24 may include not only a visible color value (such as RGB or HSV) but also control information on a pixel at the corresponding position, such as an α value (A) indicative of clarity. In this case, when the above control information included in the color information at a position corresponding to a display area of a menu image is different from its default value, for example, the operation determination unit 24 may determine that the user image is included within the display area of the menu image.

Moreover, when the maximum value of the difference values between the depth values is smaller than a predetermined threshold or when the movement is not in the direction toward the display screen, the operation determination unit 24 does not have to update the confirmation information. The remote control device can therefore avoid erroneous operation attributed to user's unintended movement.

Furthermore, the display image synthesis unit 26 may change the color of the menu image or user image, according to the difference value between depth values calculated by the operation determination unit 24. This enables a user to check the menu image which the user himself/herself has confirmed.

Second Embodiment

Next, a remote control device according to the second embodiment of the present invention will be described.

A remote control device 40 according to the present embodiment is different from the remote control device 20 according to the first embodiment in that a user image to be used in performing the operation determination process is generated and that a user image to be displayed on the display screen is generated.

Figure 6:
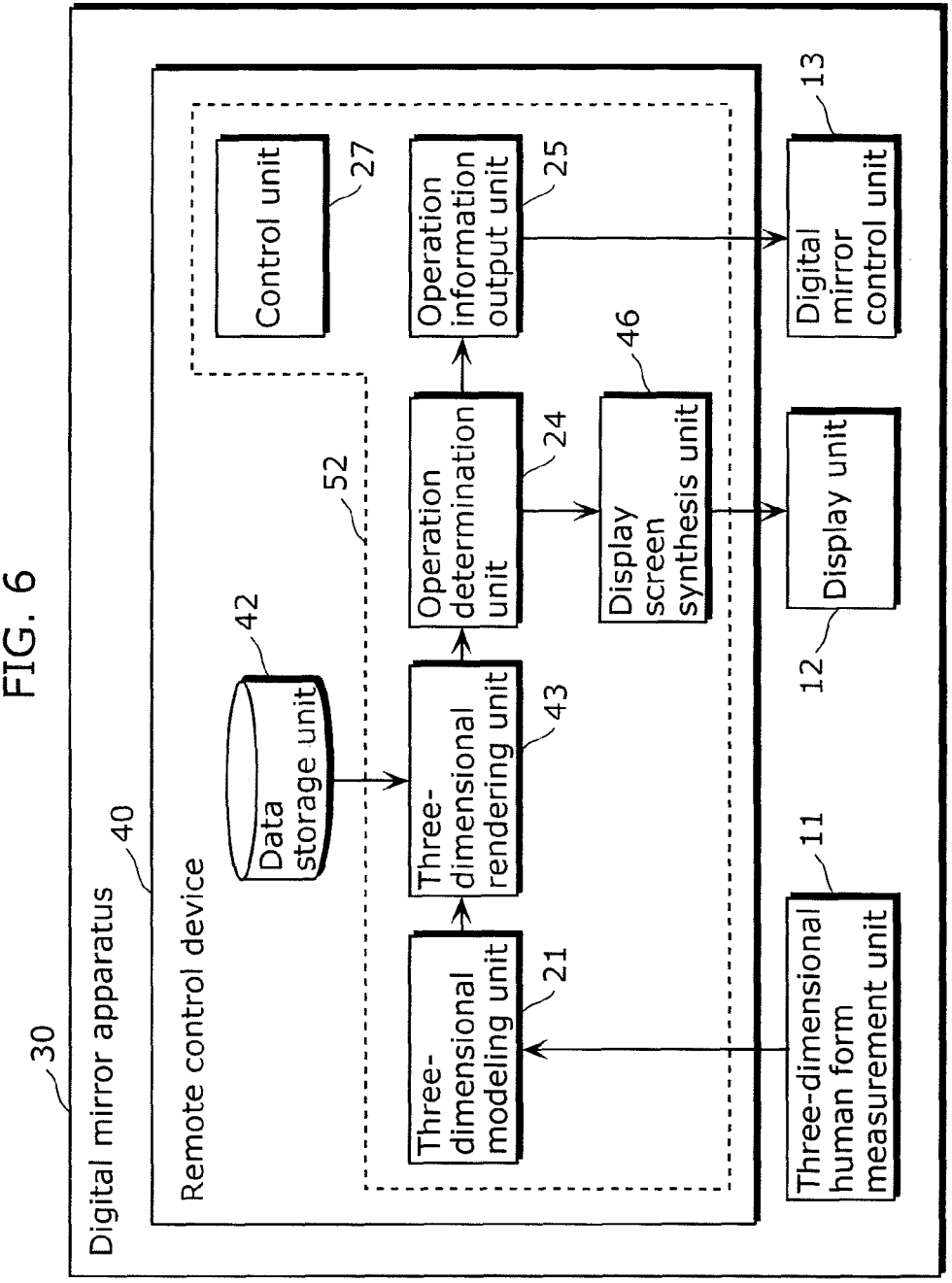
FIG. 6 is a block diagram showing a functional configuration of a digital mirror apparatus provided with a remote control device according to a second embodiment of the present invention.

FIG. 6 is a block diagram showing a functional configuration of a digital mirror apparatus 30 provided with the remote control device according to the second embodiment of the present invention. The remote control device 40 according to the present embodiment is basically the same as the remote control device 20 according to the first embodiment except part of processes in the three-dimensional rendering unit and in the display image synthesis unit and part of data stored in the data storage unit. In FIG. 6, the same components as those of FIG. 3 are denoted by the same numerals, and descriptions thereof will be omitted.

A data storage unit 42 stores the first rendering parameter including a orthogonal projection matrix (hereinafter referred to as "rendering parameter for operation") and the second rendering parameter including a perspective projection matrix (hereinafter referred to as "rendering parameter for display").

Using the rendering parameter for operation stored in the data storage unit 42, a three-dimensional rendering unit 43 performs three-dimensional rendering of the three-dimensional model generated by the three-dimensional modeling unit 21, thereby generating color information and depth information. The three-dimensional rendering unit 43 then stores the color information into a color buffer and the depth information into a depth buffer.

Moreover, using the rendering parameter for display stored in the data storage unit 42, the three-dimensional rendering unit 43 performs three-dimensional rendering of the three-dimensional model generated by the three-dimensional modeling unit 21, thereby generating the user image for display.

It is to be noted that the three-dimensional rendering unit 43 may be composed of two three-dimensional rendering units; the first three-dimensional rendering unit for generating a user image for display, and the second three-dimensional rendering unit for generating a user image for operation. In addition, the control unit 27 may perform time sharing control between the process for generating the user image for display and the process for generating the user image for operation.

A display image synthesis unit 46 generates a menu image for display based on the operation information outputted by the operation information output unit 25. The display image synthesis unit 46 then generates an image for display by combining the generated menu image for display with the user image for display generated by the three-dimensional rendering unit 43. Subsequently, the display image synthesis unit 46 outputs the generated image for display to the display unit 12.

Next, operation of the remote control device 40 configured as above will be described.

Figure 7:
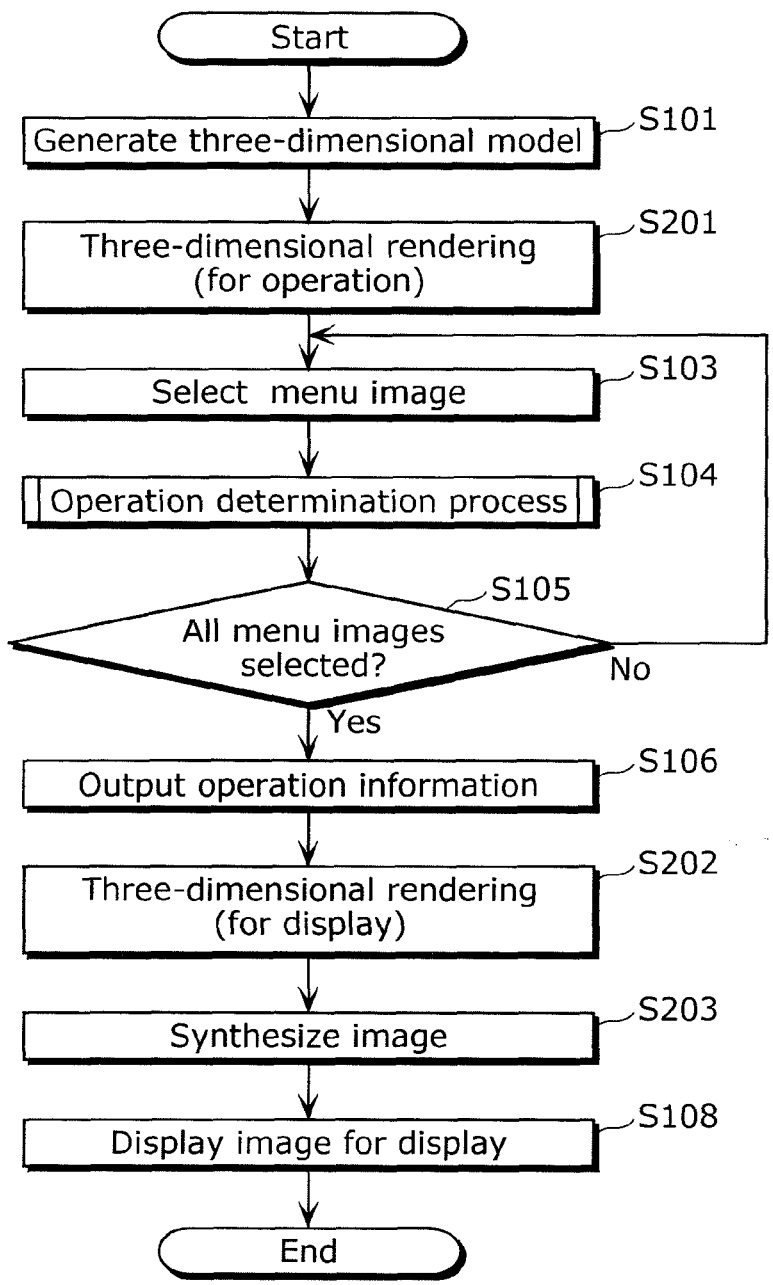
FIG. 7 is a flowchart for explaining a process flow in the remote control device according to the second embodiment of the present invention.
Figure 8:
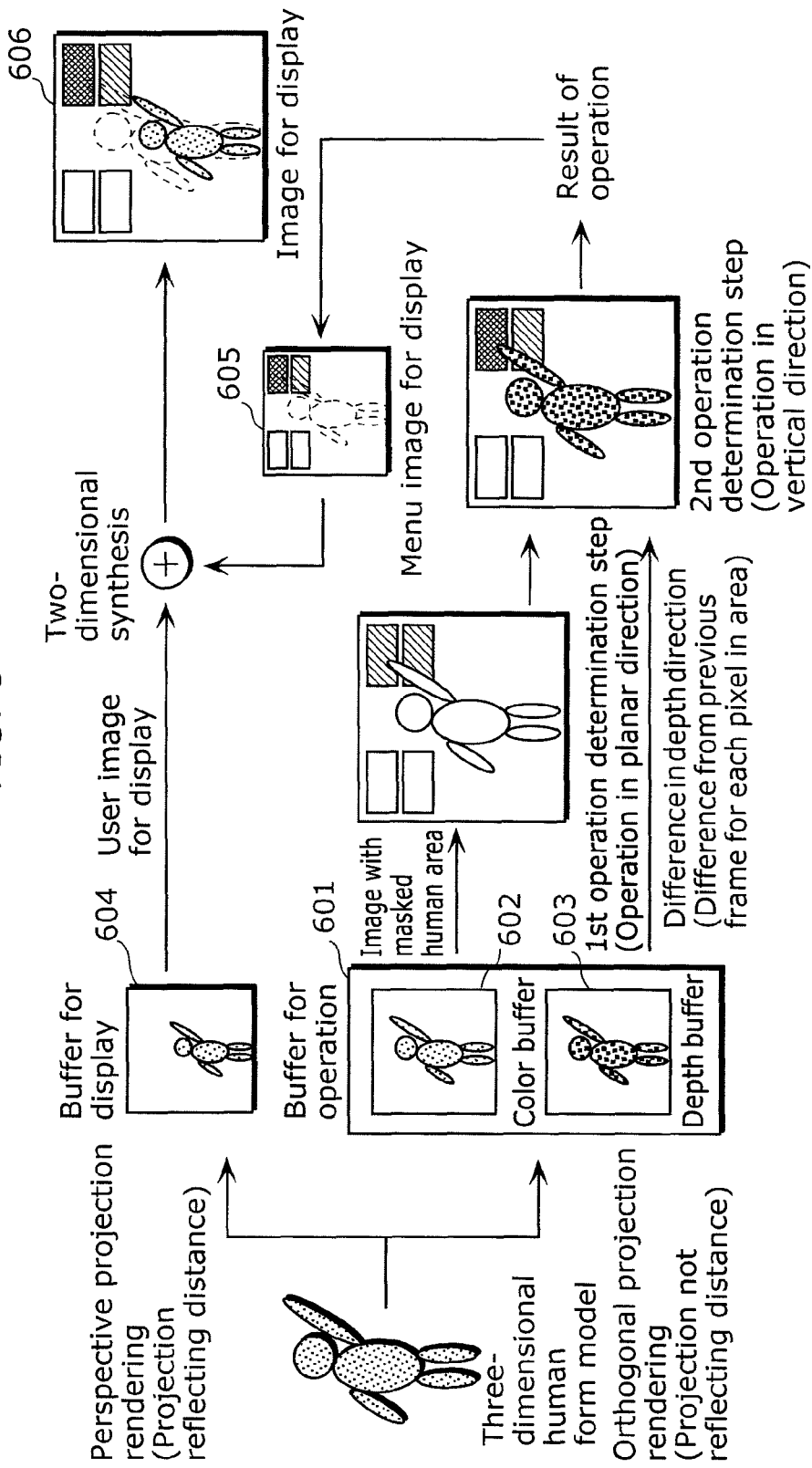
FIG. 8 is a view for explaining the process flow in the remote control device according to the second embodiment of the present invention.

FIG. 7 is a flowchart for explaining the process flow in the remote control device according to the second embodiment of the present invention. FIG. 8 is a view for explaining the process flow in the remote control device according to the second embodiment of the present invention. In FIG. 7, the same processes as those of FIG. 4A are denoted by the same numerals, and descriptions thereof will be omitted.

After the process of Step S101, the three-dimensional rendering unit 43 performs the three-dimensional rendering of the three-dimensional model to generate the user image for operation (the color information and the depth information) (S201). The three-dimensional rendering unit 43 then stores the generated color information and depth information into a rendering buffer for operation 601. In this case, the three-dimensional rendering unit 43 generates the user image for operation by using a projection matrix which is different from the projection matrix used to generate the user image for display in Step S202.

Next, the operation determination unit 24 and the operation information output unit 25 carry out the processes from Steps S103 to S106 in the same manner as in the first embodiment. In the operation determination process in Step S104, the operation determination unit 24 performs the operation determination process by using the color information and depth information stored in the rendering buffer 601. To be specific, the operation determination unit 24 performs the first operation determination by using the color information stored in a color buffer for operation 602, and carries out the second operation determination by using the depth information stored in a depth buffer for operation 603.

Next, the three-dimensional rendering unit 43 generates the user image for display by performing the three-dimensional rendering, using the rendering parameter for display, of the three-dimensional model which is the same as that used in Step S201 to generate the user image for operation. The three-dimensional rendering unit 43 stores the generated color information and depth information into a rendering buffer for display 604. In this case, the three-dimensional rendering unit 43 generates the user image for display by using a projection matrix which is different from the projection matrix used to generate the user image for operation in Step S201.

The display image synthesis unit 46 then generates a menu image for display 605 based on the outputted operation information. The display image synthesis unit 46 generates also an image for display 606 by combining the generated menu image 605 for display and the generated user image for display (S203). At the end, the display unit 12 displays the image for display 606 on the display screen.

As described above, the remote control device 40 according to the present embodiment generates the user image for operation and the user image for display from the same three-dimensional model, of which preferred examples will be described with reference to FIGS. 9 and 10.

Figure 9:
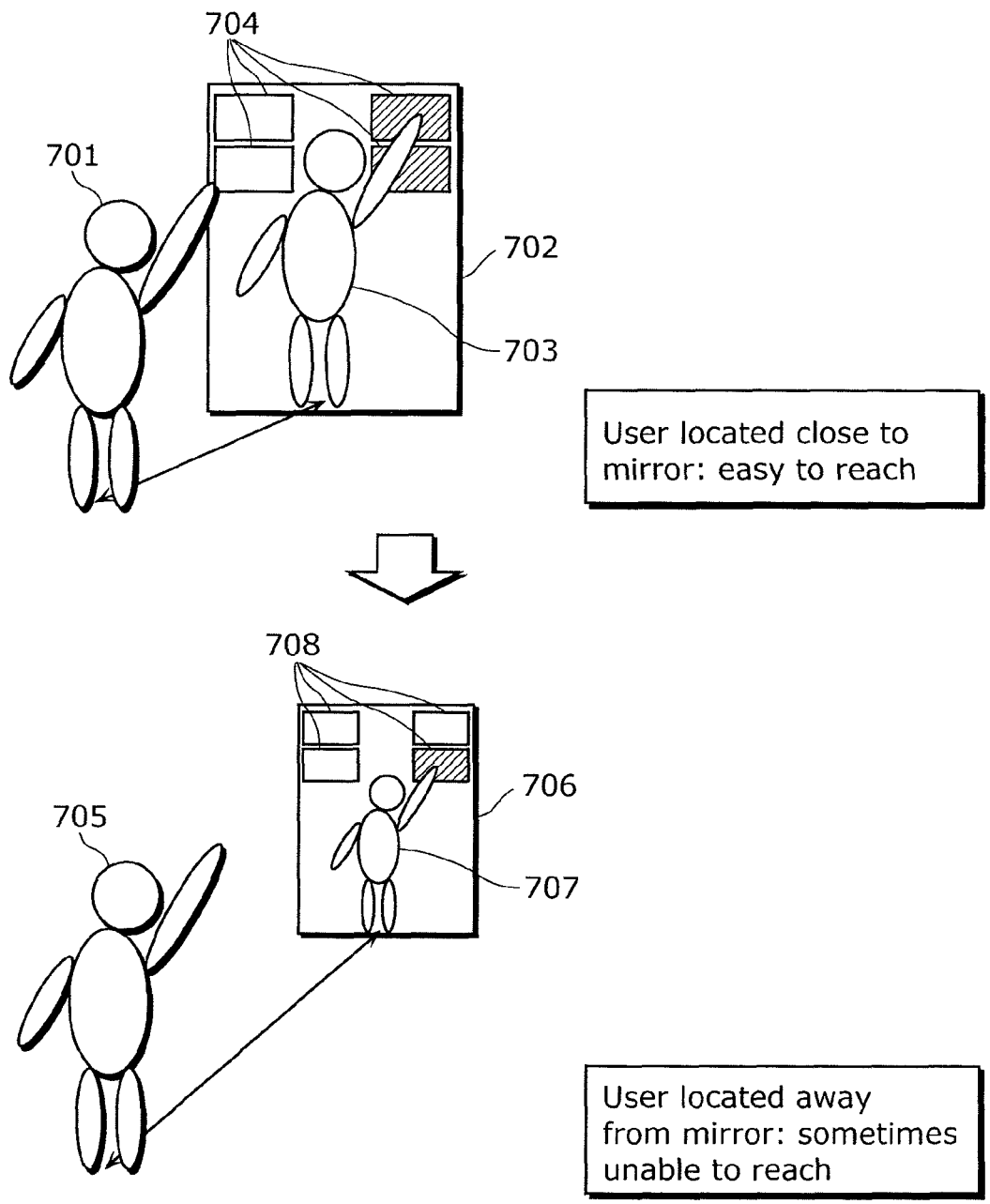
FIG. 9 is a view showing a difference in projected images depending on a positional relation between a user and a display screen.
Figure 10:
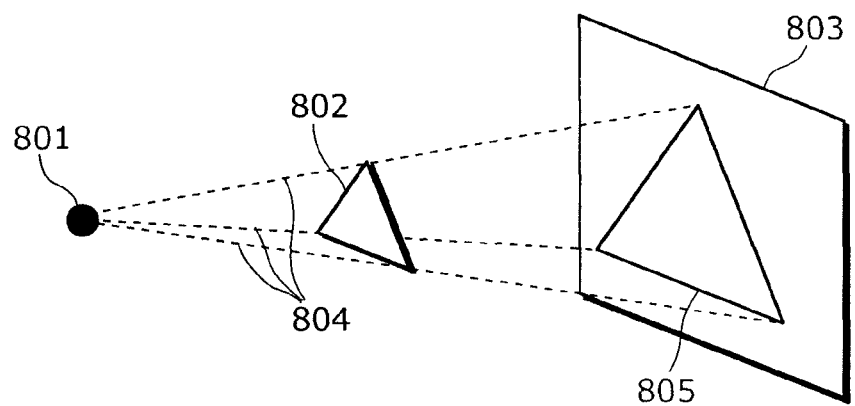
FIG. 10 is a view for explaining perspective projection.

When a user 701 is close to a display screen 702 as shown in the upper part of FIG. 9, a user image 703 displayed is large enough to reach each of menu images 704, with the result that the user 701 can point to each of the menu images 704.

When a user 705 is far away from a display screen 706 as shown in the lower part of FIG. 9, a user image 707 displayed is so small that the user image 707 may not reach menu images 708, and in such a case, the user 705 needs to move in order to point to the menu images 708.

The size of the user image thus changes according to the distance between the user and the display screen because the user image displayed on the display screen is generated typically by the perspective projection that reflects a distance. As shown in FIG. 10, the perspective projection leads to generation of a projected image 805 at the intersection of a projection plane 803 with radials 804 connecting a view point 801 and an object 802. The size of the projected image 805 therefore changes according to the distance between the object 802 and the projection plane 803. The projection formula using the perspective projection matrix is given as the following expression (1).

[Math 1]

$$\begin{bmatrix} x' \\ y' \\ z' \\ w' \end{bmatrix} = \begin{bmatrix} \frac{2n}{r-l} & 0 & \frac{r+l}{r-l} & 0 \\ 0 & \frac{2n}{t-b} & \frac{t+b}{t-b} & 0 \\ 0 & 0 & -\frac{f+n}{f-n} & -\frac{2nf}{f-n} \\ 0 & 0 & -1 & 0 \end{bmatrix} \begin{bmatrix} x \\ y \\ z \\ 1 \end{bmatrix} \quad \text{Expression (1)}$$

In the expression (1), x, y, and z represent three-dimensional coordinates before the projection, x', y', z', and w' represent homogeneous coordinates after the projection, and l, r, b, t, n, and f each represent a constant indicative of a boundary of the three-dimensional space. As is clear from the expression (1), the coordinates in the horizontal directions (X and Y directions) to the screen change depending on the vertical direction (Z direction).

Figure 11:
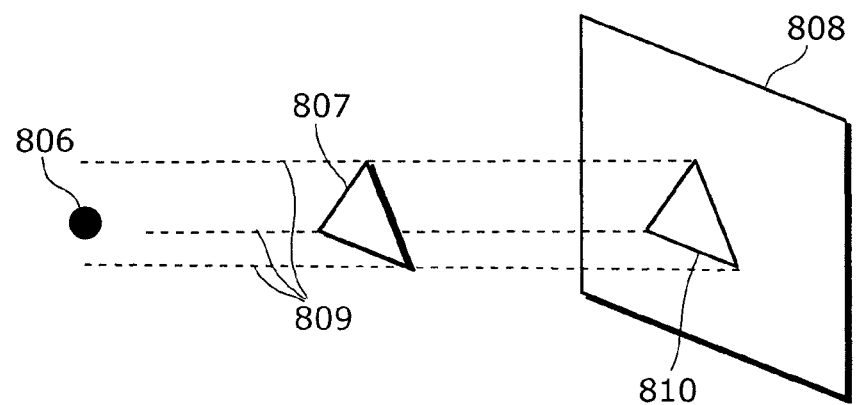
FIG. 11 is a view for explaining orthogonal projection.

On the other hand, when the user image for operation is generated by the orthogonal projection, the distance between the user and the display screen does not effect a change in the size of the user image. As shown in FIG. 11, a projected image 810 is generated at the intersection of a projection plane 808 with radials 809, each of which extends from the view point 806 to an object 807 and which are perpendicular to the projection plane 808 and parallel to each other. This keeps the projection image 810 at a constant size regardless of the distance between the object 807 and the projection plane 808. The projection formula using the orthogonal projection matrix is given as the following expression (2).

[Math 2]

$$\begin{bmatrix} x' \\ y' \\ z' \\ w' \end{bmatrix} = \begin{bmatrix} \frac{2}{r-l} & 0 & 0 & \frac{r+l}{r-l} \\ 0 & \frac{2n}{t-b} & 0 & \frac{t+b}{t-b} \\ 0 & 0 & -\frac{2}{f-n} & \frac{f+n}{f-n} \\ 0 & 0 & 0 & 1 \end{bmatrix} \begin{bmatrix} x \\ y \\ z \\ 1 \end{bmatrix} \quad \text{Expression (2)}$$

As is clear from the expression (2), the coordinates in the horizontal directions (X and Y directions) to the screen do not depend on the vertical direction (Z direction). The information in the horizontal directions and the information in the vertical direction are therefore separated accurately from each other and are thus stored into the color buffer for operation 602 and the depth buffer for operation 603, respectively.

The three-dimensional rendering unit 43 uses the orthogonal projection matrix to generate the color information and the depth information which are to be stored in the rendering buffer for operation, with the result that the user, no matter where positioned relative to the display screen in the direction perpendicular thereto, can be given the same sense of operation each time he or she points to the menu image.

Figure 12:
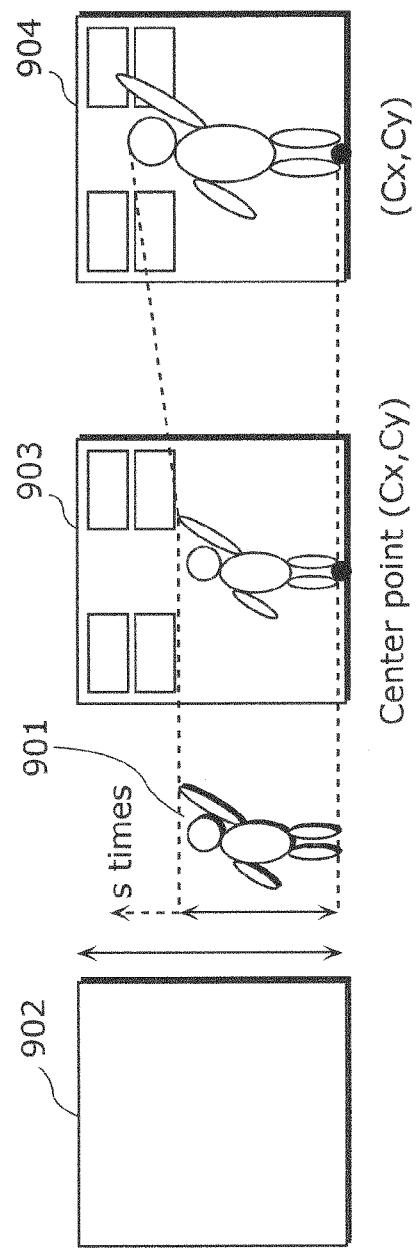
FIG. 12 is a view for explaining a variation of the second embodiment of the present invention.

It is to be noted that although the three-dimensional rendering unit 43 uses the orthogonal projection matrix to generate the user image for operation in the second embodiment, the user image for operation may be generated using other projection matrices. FIG. 12 is a view for explaining a variation of the second embodiment of the present invention. As shown in FIG. 12, a user 901 having a certain size relative to the size of a display screen 902 may have difficulty pointing to the menu image because the user image may not reach the menu or may touch it accidentally. The three-dimensional rendering unit 43 may therefore generate the user image for operation by using a projection matrix with which the size of a user image 903 changes according to the sizes (for example, measured height, width, or the like) of the user 901 and the display screen 902. To be specific, the three-dimensional rendering unit 43 may generate the user image for operation by using a projection matrix with which the user image 903 is scaled up or down s times around a point (Cx, Cy). The projection formula using the projection matrix with which the user image is scaled up or down s times is given as the following expression (3).

[Math 3]

$$\begin{bmatrix} x' \\ y' \\ z' \\ w' \end{bmatrix} = \begin{bmatrix} s & 0 & 0 & (1-s)Cx \\ 0 & s & 0 & (1-s)Cy \\ 0 & 0 & 1 & 0 \\ 0 & 0 & 0 & 1 \end{bmatrix} \begin{bmatrix} \frac{2}{r-l} & 0 & 0 & \frac{r+l}{r-l} \\ 0 & \frac{2n}{t-b} & 0 & \frac{t+b}{t-b} \\ 0 & 0 & -\frac{2}{f-n} & \frac{f+n}{f-n} \\ 0 & 0 & 0 & 1 \end{bmatrix} \begin{bmatrix} x \\ y \\ z \\ 1 \end{bmatrix} \quad \text{Expression (3)}$$

The remote control device according to the variation, which generates the user image for operation by using the projection matrix with which the user image is scaled up or down s times, is thus capable of generating a user image 904 by which the user 901 is always allowed to point to the menu image with ease regardless of the sizes of the user 901 and the display screen 902.

It is to be noted that the projection matrix for generating the user image for operation given by the present embodiment is one example, and the remote control device according to the present invention may use another projection matrix to generate the user image for operation. For example, when the remote control device generates the user image resulting from three-dimensional rendering of the three-dimensional model of the user from a view point at any position, or generates the user image which is horizontally inversed, a different projection matrix is used to generate the user image for display. Even in such a case, however, the projection matrix for generating the user image for operation may be the same. This allows the user to point to the menu image always with the same sense of operation.

Furthermore, the color information generated when the user image for operation is generated does not have to be information indicative of an actual color of the user, but only need to be information indicative of presence or absence of the user image (for example, one-bit data). This is because the user image for operation does not have to be displayed by the display unit 12. This makes it possible to save the memory of the remote control device.

Furthermore, in the present embodiment, since the user image for display, which is to be displayed on the display screen, is different from the user image for operation, which is used for the operation determination process, an outline of the user image for operation may be displayed, and the user image for operation may be displayed with a translucent color. This facilitates user's understanding of the operation.

While the remote control device according to the present invention has been described with reference to embodiments thereof, the present invention is not limited to these embodiments. The scope of the present invention includes various variation of the embodiments which will occur to those skilled in the art, and other embodiments in which element of different embodiments are combined, without departing from the basic principles of the present invention.

For example, although the remote control device in the above embodiments performs the second operation determination after the first operation determination, the second operation determination may be performed before the first operation determination. To be specific, the remote control device may determine coordinates at which an amount of the movement perpendicular to the display screen is equal to or greater than a predetermined threshold, to determine whether or not the coordinates are included within the display area of the menu image. The predetermined threshold may be, for example, a value determined in advance, or may also be the maximum value of the calculated amounts of movement.

Furthermore, although the remote control device in the above embodiments generates, by the three-dimensional rendering process, the user image which is of the same kind as that would be generated if the display screen is a normal mirror, a user image different from an image reflected in a normal mirror may be generated and outputted to the display unit. To be specific, the remote control device may perform such three-dimensional rendering that lines of vision are in parallel with the display screen, thereby generating a user image showing a side of the user, for example.

The various functional blocks of the remote control device according to the above embodiments may be implemented typically as large scale integration (LSI) which is an integrated circuit. That is, as shown in FIG. 3 or FIG. 6, the remote control device is typically composed of LSI 51 or LSI 52. These functional blocks may each be formed into one chip, or part or all of these functional blocks may together be formed into one chip. Furthermore, the data storage unit may be provided inside or outside the integrated circuit, and may be formed of a single memory or a plurality of memories. These are referred to as LSIs herein, but also referred to as integrated circuits (ICs), system LSIs, super LSIs, or ultra LSI, depending on their degrees of integration. The integrated circuit technique is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured. Furthermore, if due to the progress of semiconductor technologies or their derivations, new technologies for integrated circuits appear to be replaced with the LSIs, it is, of course, possible to use such technologies to implement the enclosed functional blocks as an integrated circuit. For example, biotechnology can be applied to the above implementation.

Figure 13:
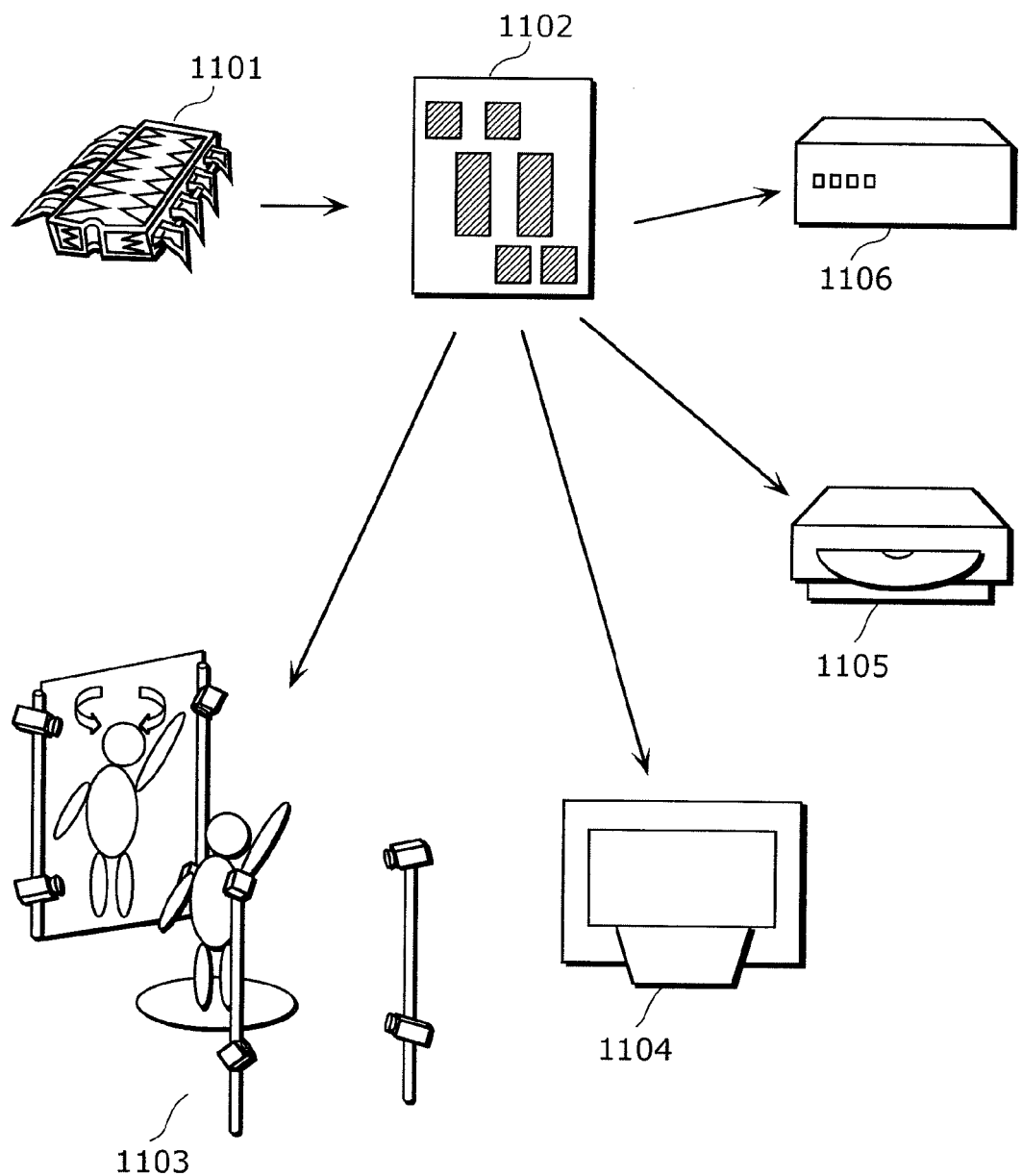
FIG. 13 is a view for explaining a variation of the present invention.

Furthermore, although the above embodiments have explained the example where the digital mirror apparatus is provided with the remote control device, other devices having functions of generating three-dimensional models of users and displaying them from any viewpoints may be provided with the remote control device. To be specific, as shown in FIG. 13, no only a digital mirror apparatus 1103 but also various devices such as a television 1104, a recorder/reproducer 1105, or a gaming machine 1106 may be provided with the remote control device. In this case, these devices each only need to include a module substrate 1102 having a system LSI 1101 composed of the functional blocks of the remote control device.

Furthermore, the present invention may be implemented as a remote control method which includes, as steps, the operation of characteristic components of the remote control device. Furthermore, the present invention may be implemented as a program which cause a computer including a central processing unit (CPU), a memory, and the like, to execute these steps included in the remote control method. Such a program may be distributed via a recording medium such as a CD-ROM or a transmission medium such as the Internet.

The remote control device according to the present invention may be used as a user interface of various devices such as a digital mirror apparatus, a television, a recorder/reproducer, or a gaming machine, each of which generates a three-dimensional model of a user and displays a user image taken from any view points based on the generated three-dimensional model.

REFERENCE SIGNS LIST

10, 30, 1103 Digital mirror apparatuses
11 Three-dimensional human form measurement unit
12 Display unit
13 Electronic mirror control unit
20, 40 Remote control devices
21 Three-dimensional modeling unit
22, 42 Data storage units
23, 43, Three-dimensional rendering units
24 Operation determination unit
25 Operation information output unit
26, 46 Display image synthesis units
27 Control unit
51, 52 LSIs
101, 201, 701, 705, 901 Users
102 Three-dimensional human form measurement device
103, 202, 702, 706, 902 Display screens
104, 203 Projected images of the users
204, 704, 708 Menu images
401 Rendering buffer
402 Color buffer
403 Depth buffer
404, 605 Menu images for display
405, 606 Images for display
601 Rendering buffer for operation
602 Color buffer for operation
603 Depth buffer for operation
604 Rendering buffer for display
703, 707, 903, 904 User images
801, 806 View points
802, 807 Object
803, 808 Projection planes
804, 809 Radials
805, 810 Projected images
1101 System LSI 1102 Module substrate
1104 Television
1105 Recorder/Reproducer
1106 Gaming machine

The invention claimed is:

1. A remote control device which outputs operation information corresponding to a menu image displayed on a display screen and specified by a user at a distance from the display screen, the remote control device comprising:
a three-dimensional modeling unit configured to generate a first three-dimensional model and a second three-dimensional model, the first three-dimensional model showing an appearance of a form of the user at a first point in time, and the second three-dimensional model showing an appearance of a form of the user at a second point in time that is later than the first point in time;
a three-dimensional rendering unit configured to (i) perform a projective transformation on the first three-dimensional model generated by the three-dimensional modeling unit, to obtain depth information indicative of a relationship between a position on a projection plane and a depth value, (ii) store the depth information into a depth buffer, and (iii) generate a first user image using the depth information, and
the three-dimensional rendering unit also being configured to (i) perform a projective transformation on the second three-dimensional model generated by the three-dimensional modeling unit, to obtain depth information indicative of relationship between a position on a projection plane and a depth value, (ii) store the depth information into the depth buffer, and (iii) generate a second user image using the depth information;
a first operation determination unit configured to determine, when the second user image generated by the three-dimensional rendering unit is displayed on the display screen, whether or not the menu image overlaps with the second user image;
a second operation determination unit configured to (i) calculate, when the second user image generated by the three-dimensional rendering unit is displayed on the display screen, an amount of movement of the second user image in a direction perpendicular to the display screen, and (ii) determine coordinates of a position specified by the user, on the display screen based on the calculated amount of the movement; and
an operation information output unit configured to output operation information corresponding to the menu image, when the first operation determination unit determines that the menu image overlaps with the second user image and when the coordinates determined by the second operation determination unit are included within a display area of the menu image,
wherein the second operation determination unit is configured to calculate as the amount of the movement a difference value between the depth value of the first user image and the depth value of the second user image with reference to the depth information stored in the depth buffer.

2. The remote control device according to claim 1, wherein the three-dimensional rendering unit is configured to generate the first user image and the second user image by using a first projection matrix in performing the three-dimensional rendering of the first three-dimensional model and the second three-dimensional model and further to generate a third user image by using a second projection matrix in performing the three-dimensional rendering of the second three-dimensional model, the second projection matrix being different from the first projection matrix, and
the third user image generated by the three-dimensional rendering unit is displayed on the display screen.

3. The remote control device according to claim 2,
wherein the first projection matrix is an orthogonal projection matrix, and
the second projection matrix is a perspective projection matrix.

4. The remote control device according to claim 2,
wherein the first projection matrix is a projection matrix with which a size of the user image changes according to a size of the user and a size of the display screen.

5. The remote control device according to claim 1,
wherein the second operation determination unit is configured to (i) calculate, when the second user image generated by the three-dimensional rendering unit is displayed on the display screen, an amount of movement in a direction perpendicular to the display screen, at each of positions within the second user image, and (ii) determine coordinates on the display screen which correspond to at least one of the positions at which the amount of movement is greater than or equal to a predetermined threshold.

6. A remote control method of outputting operation information corresponding to a menu image displayed on a display screen and specified by a user at a distance from the display screen, the remote control method comprising:
generating a first three-dimensional model and a second three-dimensional model, the first three-dimensional model showing an appearance of a form of the user at a first point in time, and the second three-dimensional model showing an appearance of a form of the user at a second point in time that is later than the first point in time;
performing a projective transformation on the first three-dimensional model generated, to obtain depth information indicative of a relationship between a position on a projection plane and a depth value, storing the depth information into a depth buffer, and generating a first user image using the depth information;
performing a projective transformation on the second three-dimensional model generated, to obtain depth information indicative of relationship between a position on a projection plane and a depth value, storing the depth information into the depth buffer, and generating a second user image using the depth information;
determining, when the second user image generated in the generating of a second user image is displayed on the display screen, whether or not the menu image overlaps with the second user image;
calculating, when the second user image generated in the generating of a second user image is displayed on the display screen, an amount of movement of the second user image in a direction perpendicular to the display screen, and determining coordinates of a position specified by the user, on the display screen based on the calculated amount of the movement; and
outputting operation information corresponding to the menu image, when in the determining of whether or not the menu image overlaps with the second user image, it is determined that the menu image overlaps with the second user image, and when the coordinates determined in the determining of coordinates are included within a display area of the menu image, wherein a difference value between the depth value of the first user image and the depth value of the second user image is calculated as the amount of the movement with reference to the depth information stored in the depth buffer.

7. An integrated circuit which outputs operation information corresponding to a menu image displayed on a display screen and specified by a user at a distance from the display screen, the integrated circuit comprising:

a three-dimensional modeling unit configured to generate a first three-dimensional model and a second three-dimensional model, the first three-dimensional model showing an appearance of a form of the user at a first point in time, and the second three-dimensional model showing an appearance of a form of the user at a second point in time that is later than the first point in time;

a three-dimensional rendering unit configured to (i) perform a projective transformation on the first three-dimensional model generated by the three-dimensional modeling unit, to obtain depth information indicative of a relationship between a position on a projection plane and a depth value, (ii) store the depth information into a depth buffer, and (iii) generate a first user image using the depth information, and the three-dimensional rendering unit is also configured to (i) perform a projective transformation on the second three-dimensional model generated by the three-dimensional modeling unit, to obtain depth information indicative of a relationship between a position on a projection plane and a depth value, (ii) store the depth information into the depth buffer, and (iii) generate a second user image using the depth information;

a first operation determination unit configured to determine, when the second user image generated by the three-dimensional rendering unit is displayed on the display screen, whether or not the menu image overlaps with the second user image;

a second operation determination unit configured to (i) calculate, when the second user image generated by the three-dimensional rendering unit is displayed on the display screen, an amount of movement of the second user image in a direction perpendicular to the display screen, and (ii) determine coordinates of a position specified by the user, on the display screen based on the calculated amount of the movement; and an operation information output unit configured to output operation information corresponding to the menu image, when the first operation determination unit determines that the menu image overlaps with the second user image and when the coordinates determined by the second operation determination unit are included within a display area of the menu image, wherein the second operation determination unit is configured to calculate as the amount of the movement a difference value between the depth value of the first user image and the depth value of the second user image with reference to the depth information stored the depth buffer.

8. A non-transitory computer-readable recording medium storing a program for outputting operation information corresponding to a menu image displayed on a display screen and specified by a user at a distance from the display screen, the computer program causing a computer to execute steps comprising:

generating a first three-dimensional model and a second three-dimensional model, the first three-dimensional model showing an appearance of a form of the user at a first point in time, and the second three-dimensional model showing an appearance of a form of the user at a second point in time that is later than the first point in time;

performing a projective transformation on the first three-dimensional model generated, to obtain depth information indicative of a relationship between a position on a projection plane and a depth value, storing the depth information into a depth buffer, and generating a first user image using the depth information;

performing a projective transformation on the second three-dimensional model generated, to obtain depth information indicative of relationship between a position on a projection plane and a depth value, storing the depth information into the depth buffer, and generating a second user image using the depth information;

determining, when the second user image generated in the generating of a second user image is displayed on the display screen, whether or not the menu image overlaps with the second user image;

calculating, when the second user image generated in the generating of a second user image is displayed on the display screen, an amount of movement of the second user image in a direction perpendicular to the display screen, and determining coordinates of a position specified by the user, on the display screen based on the calculated amount of the movement; and outputting operation information corresponding to the menu image, when in the determining of whether or not the menu image overlaps with the second user image, it is determined that the menu image overlaps with the second user image, and when the coordinates determined in the determining of coordinates are included within a display area of the menu image, wherein a difference value between the depth value of the first user image and the depth value of the second user image is calculated as the amount of the movement with reference to the depth information stored in the depth buffer.

* * * * *